United States Patent [19]

Davarian

[11] Patent Number: 4,675,880
[45] Date of Patent: Jun. 23, 1987

[54] ANTIMULTIPATH COMMUNICATION BY INJECTING TONE INTO NULL IN SIGNAL SPECTRUM

[75] Inventor: Faramaz Davarian, Los Angeles, Calif.

[73] Assignee: The United States of America as represented by the Administrator of the National Aeronautics and Space Administration, Washington, D.C.

[21] Appl. No.: 729,719

[22] Filed: May 2, 1985

[51] Int. Cl.[4] .......................... H04L 5/12; H04B 1/10
[52] U.S. Cl. ........................................ 375/39; 375/54; 375/101; 375/102; 455/65; 332/23 A
[58] Field of Search .................... 375/38, 39, 54, 55, 375/87, 102, 101; 360/42; 329/120, 124; 332/23 A; 455/35, 65

[56] References Cited

U.S. PATENT DOCUMENTS

| | | | |
|---|---|---|---|
| 3,311,442 | 3/1967 | de Jager et al. | 375/39 |
| 3,356,947 | 12/1967 | Di Toro | 325/42 |
| 3,537,008 | 10/1970 | Lakatos | 455/65 |
| 3,588,702 | 6/1971 | Tisi et al. | 375/39 |
| 3,974,450 | 8/1976 | Cunningham, Jr. | 325/344 |
| 4,019,140 | 4/1977 | Swerdlow | 325/65 |
| 4,030,033 | 6/1977 | Bibl et al. | 325/30 |
| 4,123,711 | 10/1978 | Chow | 325/62 |
| 4,286,334 | 8/1981 | Gammel et al. | 375/40 |
| 4,302,817 | 11/1981 | Labedz | 364/724 |
| 4,383,332 | 5/1983 | Glance et al. | 455/33 |

Primary Examiner—Benedict V. Safourek
Assistant Examiner—M. Huseman
Attorney, Agent, or Firm—Paul F. McCaul; John R. Manning; Thomas H. Jones

[57] ABSTRACT

A transmitter for digital radio communication creates a null by balanced encoding of data modulated on an RF carrier, and inserts a calibration tone within the null. By having the calibration tone coincide in phase and frequency with the transmitted radio frequency output for coherent demodulation of data at the receiver where the tone calibration signal is extracted and used for multipath fading compensation.

4 Claims, 7 Drawing Figures

ANTIMULTIPATH COMMUNICATION BY INJECTING TONE INTO NULL IN SIGNAL SPECTRUM

ORIGIN OF INVENTION

The invention described herein was made in the performance of work under a NASA contract, and is subject to the provisions of Public Law 96-517 (35 USC 202) in which the Contractor has elected not to retain title.

BACKGROUND OF THE INVENTION

This invention relates to digital radio communication, and more particularly to a radio communication system with transmitted pilot tone for calibration and coherent demodulation of data without the use of a conventional tracking loop.

Due to the lack of substantial demand for low cost, high performance digital signal transmission in mobile links, until recently the mobile communications industry has made very little attempt to improve the poor characteristics of traditional mobile digital radios. In fact, the approach which has been widely practiced so far is brute force which wastes bandwidth and power to combat the extremely hostile propagation medium representative of mobile links. However, the worldwide upsurge in the mobile communication market of recent years has made it clear that conventional means of mobile data transmission with their poor spectral usage cannot meet the challenging needs of the spectrally limited mobile networks of the future. Conventional digital radios such as digital pagers and mobile/portable data terminals possess an extremely poor channel utility. The channel throughput of such systems in bits/s/Hz has traditionally been about 0.1 or lower. In some new designed systems the spectral efficiency of digital transmission in mobile/portable channels has been elevated to about 0.2 bits/s/Hz which.

In the late seventies a new concept in mobile communications which utilizes a satellite repeater for mobile/portable applications was developed by NASA in the U.S. and the Department of Communications in Canada. This new mode of mobile communication not only demands high channel throughput due to limited available bandwidth but also requires good link power efficiency because the power consumption of a satellite is an important factor in determining its cost. Therefore the next generation of mobile radios must demonstrate attractive power behavior as well as superior spectral utility. However, empirical as well as analytical studies indicate that due to presence of multipath fading, propagation characteristics of mobile links experience rapid variations. Such channel variations infest the transmitted signal by generating random amplitude and phase modulation whose bandwidth equals twice the doppler. Clearly, in a mobile link, the doppler shift depends on the vehicle speed and the waveform frequency. At 800 MHz, for example, doppler values of 100 Hz or higher are not uncommon.

In principle, it is desirable to reduce the time dependent channel impairments by means of adaptive calibration techniques; however, due to the large bandwidth of these impairments, traditional equalization techniques are not effective. Therefore, conventional digital radios inherently suffer from the following limitations:

1. Since fast acquisition and stable tracking of carrier phase is not easy to achieve in fading links, coherent demodulation techniques suffer from degraded carrier tracking performance when used in mobile radios.
2. Noncoherent or differentially coherent techniques which are used as substitutes to coherent signal demodulation, such as differential Gaussian minimum shift keying (GMSK), generally suffer from losses exceeding 3 dB.
3. Nonconstant envelope signaling techniques which are usually very bandwidth efficient are not easily used in mobile links because of the amplitude fading impairment.
4. Due to the time varying random phase modulation inherent in mobile links, digital communication suffers from a link dependent error floor. This irreducible error rate is a function of doppler and the transmitted bit rate.

OBJECTS AND SUMMARY OF THE INVENTION

One object of this invention is to remedy the above limitations. More specifically, a digital signaling technique which is insensitive to multipath fading distortions is the object of this invention. In accordance with this invention, a tone is transmitted along with the digital signal for monitoring channel distortions at the receiver. This tone, referred to as the "pilot" or "calibration" tone, is extracted at the receiver to perform two simultaneous functions. First, it is used to reduce the fading impairments of the received signal, and second, it is at the same time used to perform coherent demodulation of the signal. To achieve both functions, the calibration tone must meet two requirements: first, the relative position of the tone in the channel must be carefully selected such that the tone and the signal experience the same degradation, including propagation effects and hardware imperfection; and second, the calibration tone must coincide in phase and frequency with the transmitter carrier waveform if coherent demodulation is desired.

To transmit and successfully detect a low power tone along with digital data, the tone is transmitted in a spectral null at the carrier frequency of the transmitted signal. A suitable form for the digital data is Manchester binary PCM waveform which has a null at the center of the occupied spectrum, but any coding technique may be used that spreads the data spectrum away from the carrier frequency, and therefore creates a null into which the calibration tone is inserted, as shown in FIG. 1a.

At the transmitter, high pass filters are used to completely remove the low frequency components of the digital waveform to allow for insertion of the carrier. Since the waveform energy close to DC is very small, the effect of these filters on the detected data will be small. However, these filters are helpful in protecting the low power pilot tone from spectral leakage due to the data. The passband of these filters is chosen to be marginally larger than twice the expected doppler. At the receiver, bandpass filtering extracts the calibration tone, which is then used to simultaneously demodulate data and mitigate fading impairments. For the latter, the calibration circuit estimates the fading induced impairments before the demodulation operation.

The novel features of the invention are set forth with particularity in the appended claims. The invention will

DESCRIPTION OF PREFERRED EMBODIMENTS

As recited hereinbefore, the objects of the present invention are achieved by transmitting a pilot tone with the digital data signal for calibration of the receiver. Since the carrier and the data must be confined to a bandwidth limited channel, it is necessary to create a spectral null at the appropriate location (or locations, if more than one pilot tone is considered) in the transmitted signal to accommodate the tone. Nulling of the signal spectrum can be performed by encoding of the data such that the DC component of the signal is suppressed (zero). A number of schemes exist which include (but are not limited to) the Miller code, Balanced code and correlative techniques. Each of these encoding candidates has its own advantages and drawbacks. However, the preferred scheme is the Manchester code which provides a balanced squarewave of one cycle for each bit period and changes phase 180° each time there is a transition of a bit 1 to a bit 0 or vice versa. With this approach, the digital signaling techniques is made insensitive to induced phase distortions due to multipath fading. The scheme achieves its goal by continuous calibration of the fading channel via a residual carrier or a "tone".

Figures 1, 1A:
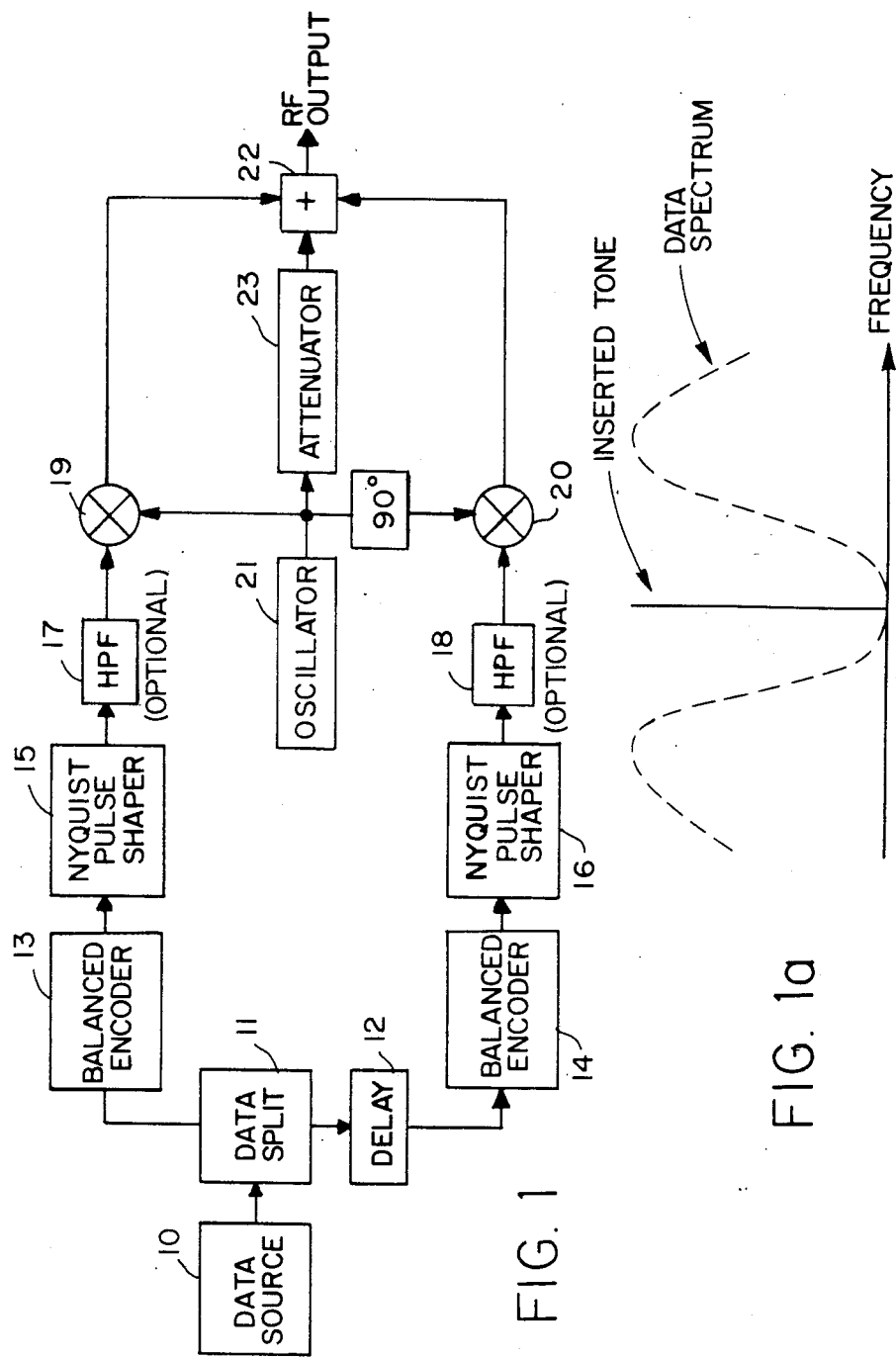
FIG. 1 is a functional block diagram of a transmitter for a radio communication system.
FIG. 1a illustrates a calibration tone inserted in the null of the transmitted data spectrum according to the present invention.

A block diagram of the transmitter resembles that of a staggered QPSK system, as is illustrated in FIG. 1. The output of a data source 10 is split into inphase and quadrature streams by a data splitter 11 and a delay 12 equal to a half bit time in one branch of the splitter. A balanced (zero-DC) encoding technique, e.g., Manchester, is applied at encoders 13 and 14 for creation of a null at the center of the RF output spectrum. Next, Nyquist pulse shaping filters 15 and 16 are introduced for signal band limiting. Highpass filters 17 and 18 are optionally used to reduce pilot band interference. At last, quadrature modulation plus residual carrier (tone) insertion is performed. Modulators 19 and 20, which receive the carrier with 0° and 90° phase shift for the inphase and quadrature Manchester encoded data streams, and a circuit 22 which adds the modulated inphase and quadrature signals with the tone signal attenuated by a circuit 23. The sum of these signals constitutes the RF output that is transmitted with a calibration tone inserted in the null created by the coding technique used to spread the data spectrum away from the carrier frequency.

Figure 2:
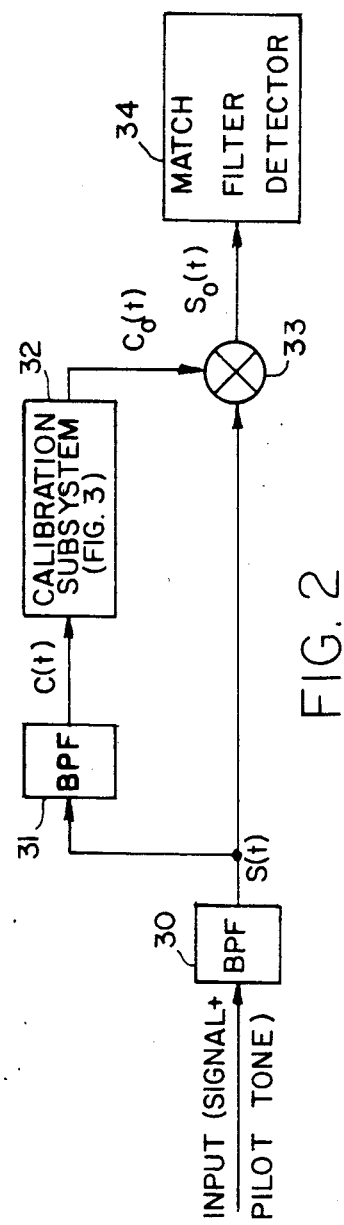
FIG. 2 is a functional block diagram of an IF receiver for the signal from the transmitter of FIG. 1.
Figure 3:
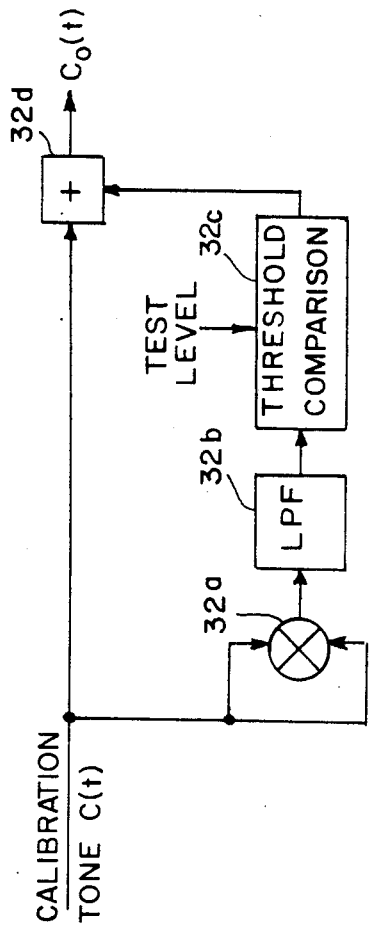
FIG. 3 is a functional block diagram of a calibration subsystem in the receiver of FIG. 2.

A receiver does not require a carrier tracking loop since the residual carrier (tone) can be utilized for coherent demodulation. Two generic types of receivers are possible, IF and base band. The IF implementation of a single-tone receiver is illustrated in FIG. 2. Conceptually, this receiver is very simple. It includes an input (signal+pilot tone) band pass filter (BPF) 30. For pilot selection, a pilot signal band pass filter (PBPF) 31 is used, followed by a calibration subsystem 32. FIG. 3 illustrates a calibration subsystem first proposed by Leland and Sollenberger ("Impairment Mechanisms for SSB Mobile Communications at UHF with Pilot-Based Coppler/Fading Correction," Bell System Tech. T., Vol. 59, pp 1923-1924, Dec., 1980) and used in analog single-sideband radios (J. McGeehan, A. Bateman, "Theoretical and Experimental Investigation of Feedforward Signal Regeneration," IEEE Trans. Vehicular Tech., Vol. VT-32, pp. 106-120, February 1983). The purpose of the calibration subsystem is to create a waveform with phase and amplitude equal and inversely proportional to that of the tones, respectively.

The pilot (calibration tone) singal C(t) is first mixed with itself in a mixer 32a and then run through a low pass filter (LPF) 32b to produce a base band signal that is compared with a test (reference) level by a threshold comparison circuit 32c to prevent division of the calibration by zero. The calibration tone signal C(t) is then divided by the output of threshold comparison circuit in a divider 32d. However, in practice this calibration subsystem may be implemented with a circuit that simply hard limits the tone calibration signal where multipath fading is not severe since the more sophisticated calibration subsystem shown simply tends to limit the amplitude of the output tone calibration signal $C_o(t)$. Referring again to FIG. 2, a mixer 33 performs the demodulation and phase correction operations simultaneously. The demodulated signal, $S_o(t)$, is subsequently match filtered and detected in a circuit 34. The match filter also removes near DC components of the input signal $S_o(t)$.

An analysis of this receiver will now be presented. At the receiver, and after the band pass filter 30, the signal plus noise can be represented as $$S(t) = aX_t\cos(\omega_o t + Y_t) + \frac{A}{\sqrt{2}} S_i(t)X_t\cos(\omega_o t + Y_t) + \quad (1)$$

$$\frac{A}{\sqrt{2}} S_q(t)X_t\sin(\omega_o t + Y_t) + N_i(t)\cos(\omega_o t) + N_q(t)\sin(\omega_o t).$$

In the above equation (1), the first term represents the fading pilot tone with $a^2/2$, $X_t$, $Y_t$, and $\omega_o$ denoting the transmitted pilot power, random amplitude modulation (due to fading), random phase modulation (due to fading), and carrier angular frequency, respectively. The next two terms represent the inphase and quadrature phase fading signals with $A^2/2$ denoting their combined power and $S_i(t)$ and $S_q(t)$ denoting the inphase and quadrature data-bearing signals. The last two terms of equation (1) are due to thermal noise with $N_i(t)$ and $N_q(t)$ two independent band limited Gaussian processes, each having power $\rho_o W$, where $\rho_o$ is the noise spectral density (one-sided) and W is the receiver band pass filter bandwidth (equivalent noise bandwidth). W is assumed to be wider than the signal bandwidth.

Assuming a band pass filter with bandwidth $B' << W$ is used to extract the pilot tone at the receiver band pass filter 31, the input to the calibration circuit can be written as:

$$C(t) = aX_t \cos(\omega_o t + Y_t) + N'_i(t) \cos \omega_o t + N'_q(t) \sin \omega_o t \quad (2)$$

where $N'_i(t)$ and $N'_q(t)$ are noise terms with power $\eta_o B'$. For convenience, equation (2) may be rewritten as $$C(t) = \rho(t) \cos(\omega_o t + Y_t + \theta(t)) \quad (3)$$

where $\rho(t)$ denotes the pilot tone envelope and $\theta(t)$ is a phase modulation due to thermal noise. For the following analysis, assume perfect delay equalization of receiver filters to allow timely amplitude and phase correction. The lower arm of the calibration circuit (FIG. 3) extracts the square of the envelope $p(t)$ of the calibration tone; hence, the output of this circuit is given as $$C_o(t) = \frac{\cos(\omega_o t + Y_t + \theta(t))}{\rho(t)} \quad (4)$$

Now referring to FIG. 2, the demodulation of the received waveform by the carrier results in a base band signal which can be given by $$S_o(t) = \frac{A}{\sqrt{2}} \frac{X_t}{2\rho(t)} S_i(t)\cos[\theta(t)] - \frac{A}{\sqrt{2}} \frac{X_t}{2\rho(t)} S_q(t)\sin[\theta(t)] + \frac{N_o(t)}{2\rho(t)} \quad (5)$$

where $N_o(t)$ is an additive white Gaussian noise process with power $\eta_o W$. For an ideally calibrated system, wherein the LPF 32b in the calibration arm (FIG. 3) is narrow enough to result in $\theta(t)=0$ and $\rho(t)=X_t$, the observed waveform is given by $$S_{oideal}(t) = \frac{A}{2\sqrt{2}} S_i(t) + \frac{N_o(t)}{2X_t} \quad (6)$$

Note that the 3-dB bandwidth of the fading process, $X_t$, equals twice the Doppler frequency which is much smaller than the bandwidth of $N_o(t)$. Therefore $X_t$ varies slowly over the data bit interval associated with $S_i(t)$ and can be treated as a time-independent random variable. A typical range of the bit rates in bits per second is 1200 to 32000 while the Doppler frequency is about 100 Hz at 800 MHz. If $S_i(t)$ of equation (6) consists of an antipodal signal set, then utilizing a conventional digital bit detection technique results in the following error probability:

$$P_e = \frac{1}{2} \int_0^\infty \text{erfc}(\sqrt{\Gamma}) p(\Gamma) d\Gamma \quad (7)$$

where $\Gamma = \gamma X_t^2$ with $\gamma = A^2/(2\eta_o B)$ denoting the mean signal-to-noise ratio over fading, and B denoting the detection filter bandwidth;

$$\text{erfc}(x) = \frac{2}{\sqrt{\pi}} \int_x^\infty \exp(-t^2) dt$$

and $p(\Gamma)$ denoting the distribution of $\Gamma$ over $[0, \infty]$. For Rayleigh and Rician fading channels $p[\Gamma]$ is readily available. Thus, $$p(\Gamma) = 1/\gamma \exp\left(\frac{\Gamma}{\gamma}\right) \quad (8)$$

represents the distribution of $\Gamma$ for Rayleigh channels, and $$p(\Gamma) = \frac{1+K}{\gamma} \exp(-K) \exp\left[-(1+K)\frac{\Gamma}{\gamma}\right] I_o\left[2\sqrt{\frac{\Gamma}{\gamma}(1+K)K}\right] \quad (9)$$

represents the same distribution for Rician channels with K denoting the propagation signal-to-noise ratio in a Rician channel and $I_o[\cdot]$ denoting the modified Bessel function of order zero.

For a large value of K, equation (9) represents a slightly fading channel wherein the received waveform is dominated by a steady signal component. On the other hand, small values of K indicate a severely fading channel wherein multipath components dominate. In fact, as K approaches zero the channel assumes the Rayleigh characteristic of equation (8).

While equation (8) is widely used to model terrestrial links, equation (9) is best suited to describe satellite-aided mobile channels. Terrestrial mobile networks suffer from an extremely hostile propagation environment due to the lack of a stable path between the transmit and receive antennas. For this reason terrestrial mobile radios have to utilize low-gain omnidirectional antennas which show no discrimination against multipath. On the contrary, satellite mobile links enjoy a stable path between the satellite and the mobile receiver and, hence, are able to utilize mobile antennas which can moderately discriminate against the fading components. Parameter K of equation (9), which represents the steady signal to fading component power ratio, strongly depends on the satellite elevation angle and the mobile antenna beam pattern. Empirical data indicate that in Canada, this ratio is about 6 dB if mobile antenna gain is about 4 dBi. However, higher values of K are expected for the U.S. because of larger satellite elevation angle.

For the nonideal case, the demodulated inphase signal if given by equation (5). The link error possibility for this case is conditioned on two random variables, $\Gamma$ and $\theta$. Assuming $\rho(t)$ is slowly varying over the bit periods associated with $S_i(t)$ and $S_q(t)$, this conditional error probability is given by $$P_e/\Gamma, \theta = \tfrac{1}{4}\text{erfc}[\sqrt{\Gamma} \cos\theta] + \tfrac{1}{4}\text{erfc}[\sqrt{\Gamma}(\cos\theta + \sin\theta)] + \tfrac{1}{4}\text{erfc}[\sqrt{\Gamma}(\cos\theta - \sin\theta)]. \quad (10)$$

Therefore, $P_e$ can be computed by $$P_e = \int_0^\infty \int_{-\pi}^{\pi} P_e/\Gamma, \theta \, p(\theta/\Gamma) p(\Gamma) d\theta d\Gamma \quad (11)$$

In the above expression $p(\Gamma)$ represents PDF (Probability Density Function) of $\Gamma$ and is given by either equation (8) or (9). The conditional density of $\theta$, the phase modulation due to the band pass noise, can also be computed in closed form, i.e., with $$erf(x) = \frac{1}{\sqrt{2\pi}} \int_0^x \exp\left(\frac{-t^2}{2}\right) dt;$$

is is given by $$p(\theta/\Gamma) = \frac{e^{-\delta\Gamma}}{2\pi} + \frac{\sqrt{2\delta\Gamma}\cos\theta\exp[-\delta\Gamma\sin^2\theta]}{2\sqrt{2\pi}}[1 + 2erf(\sqrt{2\delta\Gamma}\cos\theta)] \quad (12)$$

where $\delta=(B/B')(a/A)^2$. As mentioned earlier, for the system under consideration we have $B/B'>>1$.

Generally speaking, performance of coherent receivers strongly depends on the stability of the recovered carrier phase. In the present system, equation (12) illustrates the spreading of this phase. Clearly, the phase spreading can be reduced if $\delta\Gamma$ is increased. Coefficient $\delta$ depends on two factors: $B/B'$ and $(a/A)^2$. For a fixed $B/B'$, increasing the pilot tone power $(a^2/2)$ can substantially reduce phase noise, resulting in lower link error rate. However, increasing pilot tone power reduces the overall system performance by requiring more transmitter power. It appears that for each value of $B/B'$, an optimum value of $(a/A)^2$ exists which results in the lowest bit error rate for a given transmitted power. For values of $B/B'$ larger than 40, however, it can be easily shown the the power consumed by the pilot tone is negligible.

Figure 5:
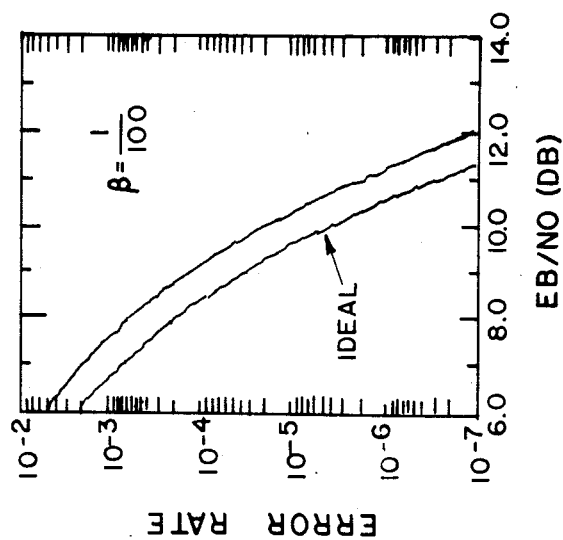
FIGS. 4a and 5 are graphs of the error rate of the system of FIGS. 1-3 as a function of $E_b/N_o$ for $B/B'$ equal to 40 and 100, respectively.
Figure 4:
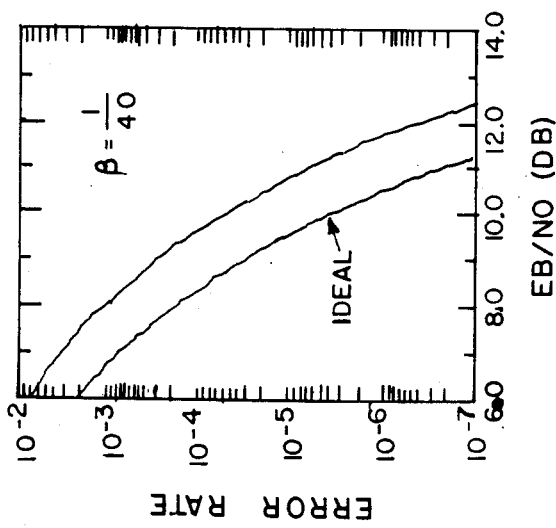

The bit error rate of the present system can be computed from equation (11). This equation, however, is difficult to evaluate analytically; therefore, a digital computer was utilized to determine the error rate. However, fading was not simulated. Defining $\beta=B'/B$, FIG. 4 shows the link error probability as a function of $E_b/\eta_o$ for $\beta=1/40$. This result indicates only 1.3 dB power loss as opposed to about 3 dB loss of the techniques found in the systems disclosed by S. Ogose, K. Murota, "Differentially Encoded GMSK with 2-Bit Differential Detection," Trans. IECE Japan, Vol. 64B, No. 4, p. 248, April 1981 (in Japanese), and M. Simon, C. Wang, "Differential versus Limiter/Discriminator Detection of Narrowband FM," IEEE Trans. Commun., pp. 1227-1234, November, 1983. FIG. 5 shows a similar scenario with $\beta=1/100$. In this case, power degradation is reduced to about 0.8 dB. Reducing $\beta$ to lower than 1/100 will have very little effect on the receiver performance since not much power is going to be recovered. However, in theory at least, the power loss diminishes as $\beta$ approaches zero.

A tone calibrated receiver operating at IF has been described with reference to FIG. 2. That receiver configuration poses certain difficulties in practice in view of the stringent phase and amplitude response requirements of the IF filters. In addition to the tough demand for precision, the narrow bandwidth of the pilot BPF prevents pilot detection at a reasonable IF frequency such as 45 mHz. In fact an experimental system constructed for the concept verification of this receiver was implemented at 10 kHz. To avoid difficulties associated with this approach, base band processing of the received signal appears a logical alternative to processing at IF.

Figure 6:
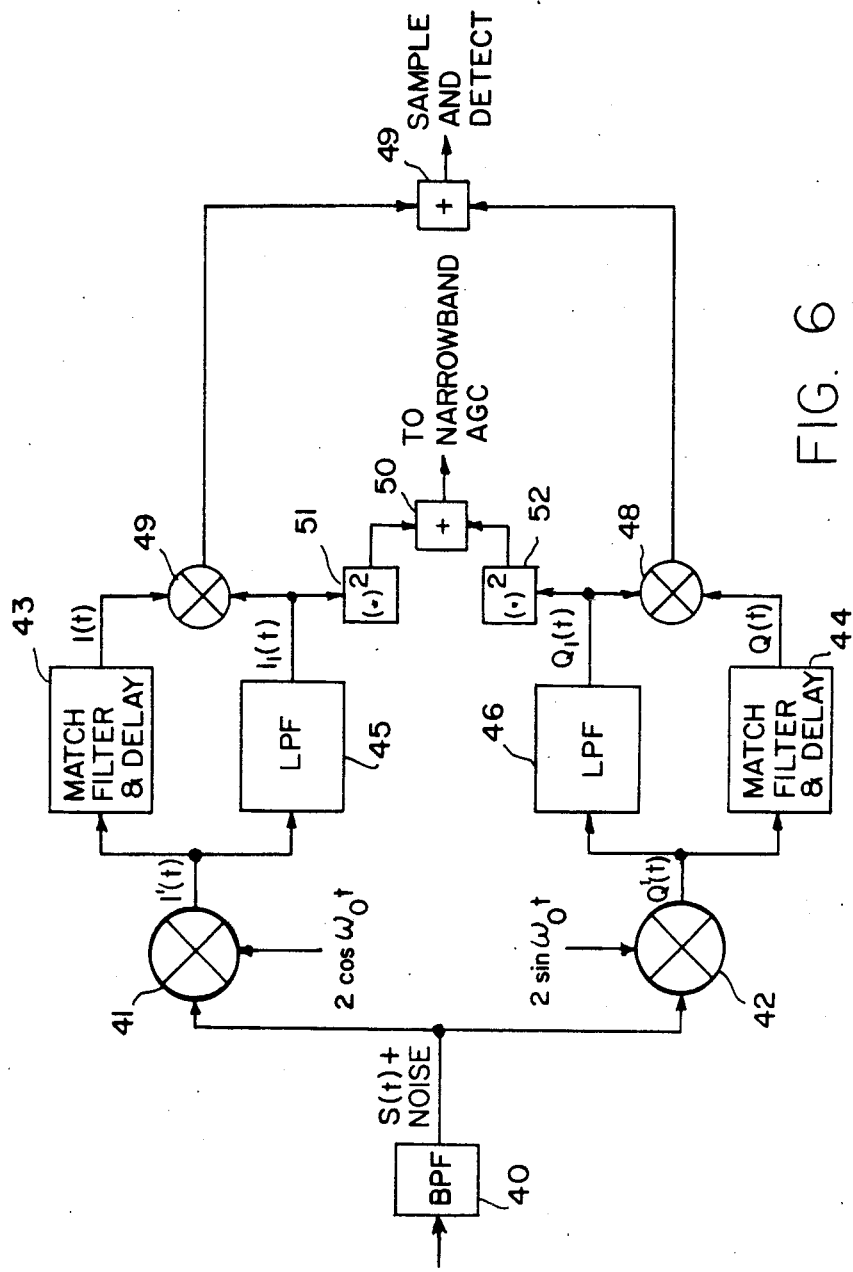
FIG. 6 is a functional block diagram of a base band receiver.

A base band receiver is shown in FIG. 6. Note that after a predetection base band filter (BPF) 40 the link is divided into two independent channels by mixers 41 and 42, i.e., inphase and quadrature signals I' and Q'. This scheme has the advantage of using base band filters in place of the IF filters. First, the receiver incoherently mixes the input signal S(t) with the inphase and quadrature waveforms $2\cos\omega_o t$ and $2\sin\omega_o t$ in the mixers 41 and 42, creating the pair of quadrature base band signals I' and Q'. Subsequently, necessary operations for tone detection and signal match filtering are performed in both the inphase and quadrature signal paths using match filters 43 and 44, low pass filters (LPF) 45 and 46, mixers 47 and 48, and a summer 49 to combine the two channels into a signal that is then sampled and detected. The predetection BPF 40 is used for noise band limiting with no effect on the signal. The first pair of mixers create the signals I'(t) and Q'(t) for the inphase and quadrature channels, respectively. Mixers 47 and 48 create the product of the outputs from the low pass filters 45 and 46 with the outputs of the match filters 43 and 45, respectively. The matched filters serve two purposes: (1) to maximize the signal to noise ratio at the output of the filter, and (2) to remove the DC term due to the pilot.

It can be shown that the output signal in FIG. 6 to the sampler is dependent on the square of the fading amplitude. Therefore, the dynamic range of this signal may be overwhelming for practical implementation of the detector. To obviate this problem, two alternatives exist. Signals $I_1(t)$ and $Q_1(t)$ can be hardlimited prior to entering the mixers 47 and 48. This operation will reduce the detector input dependency on the square of the fading amplitude to a dependency on the fading amplitude itself. The other option is to use the estimate of the square of the pilot amplitude at the output of a summer 50 which sums $I_1^2$ and $Q_1^2$ produced by squaring circuits 51 and 52 to wipe out fading amplitude totally. This can be achieved by dividing the output of the summer 49 with the output of the summer 50.

Although analog techniques have been implied, it is evident that digital techniques may be used to implement the transmitters and receivers. An advantage of the digital techniques over the analog technique is better control of the spectral null into which the tone is inserted by the transmitter, and better extraction of the calibration tone at the receiver and better estimates of the fading induced impairments on the received signal before the demodulation operation by the match filter and detector. Consequently, the claims are intended to encompass both analog and digital techniques.

What is claimed is:

1. A method of radio communication comprised of the steps of transmitting a radio frequency signal so modulated with digital data as to produce a null in its radio frequency spectrum, and injecting in the modulated radio carrier signal a calibration tone within said null for use by receivers for compensation of multipath fading distortions, including the steps at a receiver of base band filtering the received signal, dividing the base band filtered signal into inphase and quadrature base band signals, low pass filtering said inphase and quadrature base band signals for detection of said tone calibration signal and signal match filtering said inphase and quadrature base band signals, mixing the detected calibration tone and match filtered signals of the inphase base band signal and separately of the quadrature phase signal, and summing the resulting signals of said separate mixing steps to combine them into a signal suitable for sampling and data detection.

2. Apparatus for radio communication of digital data with multipath fading compensation comprised of a transmitter having means for splitting said digital data into inphase and quadrature signals, means for applying balanced encoding of data for each signal to create a null at the center of a radio carrier frequency output spectrum, means for signal band limiting each of said balanced encoded signals, means for quadrature modulation of each signal with a calibration tone, and means for summing the resultant signals with said calibration tone, thereby inserting said calibration tone at said null of the balanced data encoded radio frequency spectrum, and a receiver of said radio frequency output of said transmitter having means for extracting the signal received by band pass filtering and means for band pass filtering said calibration tone from the band pass filtered signal received, means for mixing the band pass filtered calibration tone with itself, means for low pass filtering the output of said mixing means to produce a base band signal, means for threshold comparison of said base signal with a test level, and means for algebraically dividing said band pass filtered calibration tone by the output of said threshold comparison means, and means for mixing said calibration tone with said extracted signal received, thereby compensating for multipath fading, wherein said calibration tone at said transmitter coincides in phase and frequency with the transmitted radio carrier frequency signal for coherent demodulation of data at the receiver.

3. Apparatus for radio communication of digital data with multipath fading compensation comprised of a transmitter having means for splitting digital data into inphase and quadrature signals, means for applying balanced encoding of data for each signal to create a null at the center of a data modulated radio frequency output spectrum, means for signal band limiting each of said balanced encoded signals, means for quadrature modulation of the two signals, and means for summing said signals with a calibration tone, thereby inserting said calibration tone at said null of the radio frequency output spectrum, and a base band receiver of said data modulated radio frequency carrier of said transmitter with said calibration tone, said receiver having means for dividing a received signal into inphase and quadrature base band signals, separate means for each of said inphase and quadrature base band signals for calibration tone detection and signal match filtering, means for mixing the detected calibration tone and match filtered signals of the inphase base band signal and separately of the quadrature phase signal, and means for summing the outputs of said separate mixing means to combine them into a signal suitable for sampling and data detection.

4. Apparatus as defined in claim 3 including a predetection band pass filter of the signal received before dividing into inphase and quadrature base band signals for noise band limiting.

* * * * *